Patented Nov. 14, 1950

2,529,735

UNITED STATES PATENT OFFICE 2,529,735

GLASS CUTTER

Harry Martin, Cornbrook, Manchester, England

Application March 15, 1947, Serial No. 734,882
In Great Britain March 20, 1946

1 Claim. (Cl. 49—52)

This invention relates to glass cutters of the kind having a head in which is mounted a cutting wheel.

The object of the present invention is an improved construction of head as regards the mounting of the cutter wheel, so as to simplify and reduce the cost of manufacture and repair.

According to the invention the improved glass cutter of the kind referred to is characterised in that the head is formed at one side with a recess and by an insert fitting into such recess, said insert carrying a pivot for the cutting wheel and with the said recess forming a space in which the wheel is housed so that a portion of its periphery projects therefrom.

Preferably, the insert is secured by a single fixing means which may provide for detachment for renewing the wheel.

In the accompanying drawing—

Figures 1, 2:
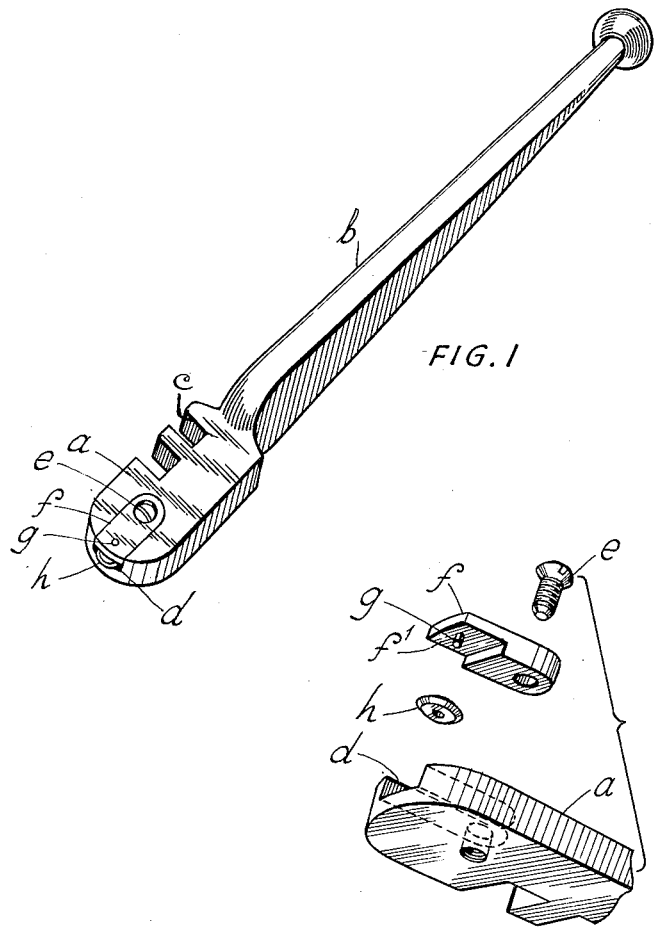
Fig. 1 is a perspective view showing one example of glass cutter made in accordance with the invention.
Fig. 2 is an exploded view showing the component parts of the cutter shown in Fig. 1.

In the example of the invention shown in the drawing, the improved glass cutter consists of a head part $a$ made as a metal die-casting of flat shape having a stem $b$ forming a handle and in the head-like part on one side there are provided a plurality of notches $c$ for use in known manner to assist in breaking the glass after cutting. In one side of the head is formed a flat-bottomed recess $d$ of elongated D-shape slightly deeper than half the thickness of the head, and at the centre of the curved end is a tapped hole for a fixing screw $e$. Fitting into such recess is an insert $f$ of similar elongated D-shape, having a clearance hole for the fixing screw whilst at its other end the insert is formed with a rebate $f'$ on its inner face from which projects a small pin $g$ forming the pivot for the cutting wheel $h$. When the insert is in position, such rebate, together with the recess in the head, forms a housing for the cutter wheel, from which, as shown in Fig. 1, part of the wheel periphery projects.

The wheel is preferably made of tungsten carbide and when the wheel or its pin are worn, it is an easy matter to effect repair or replacement. The wheel is only retained on its pivot pin by reason of the pin being made of such length that it substantially abuts against the face of the recess when the insert is in position.

The main advantages of the construction are its simplicity for manufacture, assembly and dismantling for replacement of worn parts and the rigidity of the wheel pivot.

What I claim is:

An improved wheel glass cutter including a head provided with a handle extending therefrom, said head having on one side thereof an elongated recess of lesser width than the width of the head and whose opposed sides are generally parallel with each other and with the handle, an insert of the same general shape and size as the recess which is received in and which engages the sides of the recess with a relatively snug fit, cutter wheel, the inner surface of the outer section of the insert being cut away to form, with the opposed wall section of the recess, a housing for the cutter wheel, a pivot for the cutter wheel which is secured to the insert and which extends towards such wall section of the recess, a portion of the periphery of the wheel projecting from the housing, and a screw for securing the insert in the recess.

HARRY MARTIN.

REFERENCES CITED

The following references are of record in the file of this patent:

UNITED STATES PATENTS

| Number | Name | Date |
| --- | --- | --- |
| 557,200 | Goodell | Mar. 21, 1896 |
| 915,818 | Baldwin | Mar. 23, 1909 |
| 1,419,310 | Ryther | June 13, 1922 |